United States Patent
Jun et al.

(10) Patent No.: US 6,421,343 B1
(45) Date of Patent: Jul. 16, 2002

(54) ASYNCHRONOUS TRANSFER MODE HOST ADAPTER APPARATUS WITH ABILITY OF SHARED MEDIA ACCESS

(75) Inventors: Jong Arm Jun; Chan Kim; Yeong Ho Park; Ik Kyun Kim; Young Wook Cha; Kyou Ho Lee; Hyup Jong Kim; Jae Geun Kim, all of Daejeon (KR)

(73) Assignees: Electronics and Telecommunications Research Institute, Daejeon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/137,535

(22) Filed: Aug. 21, 1998

(30) Foreign Application Priority Data

Dec. 24, 1997 (KR) ............................................. 97-73023

(51) Int. Cl.⁷ .............................. H04L 12/28; H04J 3/24
(52) U.S. Cl. ........................................ 370/395; 370/474
(58) Field of Search ................................ 370/230, 395, 370/396, 389, 397, 474, 463, 466

(56) References Cited

U.S. PATENT DOCUMENTS

| | | | |
|---|---|---|---|
| 5,535,201 A | | 7/1996 | Zheng |
| 5,602,853 A | * | 2/1997 | Ben-Michael et al. ...... 370/474 |
| 5,610,921 A | | 3/1997 | Christensen |
| 6,026,443 A | * | 2/2000 | Oskouy et al. ............. 709/230 |
| 6,167,049 A | * | 12/2000 | Pei et al. .................... 370/395 |

* cited by examiner

Primary Examiner—Wellington Chin
Assistant Examiner—Brenda Pham
(74) Attorney, Agent, or Firm—Antonelli, Terry, Stout & Kraus, LLP

(57) ABSTRACT

An asynchronous transfer mode (ATM) host adapting apparatus comprising: a storage block for storing packet information, received cells, and parameters; an ATM network interface handling block for performing direct memory access of ATM cells and parameter stored therein, segmenting transmit packet information, reassembling received cells, transmitting and receiving the ATM cells to physical media cell received, and arbitrating in the direct memory access; and a secondary interface block for connecting the storage block to the ATM network interface handling block.

17 Claims, 8 Drawing Sheets

| ADDRESS REGION | DESCRIPTION | |
|---|---|---|
| REGION-A | SEGMENTATION STATUS QUEUE | ~200 |
| REGION-B | SEGMENTATION TRANSMIT RING | ~210 |
| REGION-C | SEGMENTATION DESCRIPTOR TABLE | ~220 |
| REGION-D | SEGMENTATION VC TABLE | ~230 |
| REGION-E | SEGMENTATION RATE TABLE | ~240 |

| ADDRESS REGION | DESCRIPTION | |
|---|---|---|
| REGION_A | REASSEMBLY STATUS QUEUE | ~300 |
| REGION_B | REASSEMBLY CELL MEMORY | ~310 |
| REGION_C | REASSEMBLY FREE BUFFER DESCRIPTOR TABLE | ~320 |
| REGION_D | REASSEMBLY VC TABLE | ~330 |
| REGION_E | REASSEMBLY HASH TABLE | ~340 |

| ADDRESS | CONTENTS | | |
|---|---|---|---|
| HASH TABLE INDEX 0 | MODE(2) | RESERVED(6) | HASH BUCKET CHAIN POINTER# 0 (24) |
| HASH TABLE INDEX 1 | MODE(2) | RESERVED(6) | HASH BUCKET CHAIN POINTER# 1 (24) |
| HASH TABLE INDEX 2 | MODE(2) | RESERVED(6) | HASH BUCKET CHAIN POINTER# 2 (24) |
| ⋮ | ⋮ | ⋮ | ⋮ |
| HASH TABLE INDEX N | MODE(2) | RESERVED(6) | HASH BUCKET CHAIN POINTER# N (24) |

ASYNCHRONOUS TRANSFER MODE HOST ADAPTER APPARATUS WITH ABILITY OF SHARED MEDIA ACCESS

BACKGROUND OF THE INVENTION

1. Field of the Invention

The present invention relates to an apparatus for controlling a network access of an asynchronous transfer mode (ATM) host adapter and more particularly to an host adapting apparatus which can be applied to an ATM apparatus connected to a small scale shared media type ATM network as well as a general ATM host apparatus.

2. Discussion of Related Art

According to structure of an existing ATM adapter, access of shared media is not considered. A general ATM adapter structure is divided as follows.

First, there are two methods in packet segmentation. One is storing transmit packet data in a host memory, and the other is storing the transmit packet data in a local memory of an adapter. While the former method has an advantage of greatly reducing a size of the adapter's local memory, it has a drawback of decreasing efficiency of a system bus due to access to the system bus in the units of cells. The latter method increases the efficiency of the system bus by accessing the system bus in the units of packets, but it has a drawback of requiring a large size of the local memory.

Second, when using the host memory, the packet data in the host memory is segmented in the units of cells and then stored in the shared local memory, or the packet data is stored in a dedicated small size buffer within the adapter and then transmitted to a physical link.

In the former case, since access to a local bus is performed in the units of cells, there is a drawback of increasing contention of the local bus.

Third, there are two methods in packet assembly. One is storing cells received from the physical link in the shared local memory, and the other is storing the cells in the dedicated small size buffer within the adapter. When the cells are transmitted from the physical link, since there are various bursts, a very large buffer is required. So the lather method is more efficient than the former.

SUMMARY OF THE INVENTION

Accordingly, the present invention is directed to an ATM host adapter apparatus with ability of shared media access that substantially obviates one or more of the limitations and disadvantages of the related art.

An object of the present invention is to provide an ATM host adapting apparatus for preventing damage in traffic flow properties over shared media by instantaneously adding cells every predetermined period in an ATM host, and allowing the ATM host to access a home area or small business area ATM access network having single ring topology.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an ATM host adapter apparatus includes: a storage block(local memory) for storing packet information, received cells, and parameters; an ATM network interface handling block for performing direct memory access(DMA) of ATM cells and parameter stored therein, segmenting transmit packet information, reassembling received cells, transmitting and receiving the ATM cells to physical shared media, and arbitrating in the direct memory access; and a local bus for connecting the storage block to the ATM network interface handling block.

The present invention provides structure of shared medium access, segmentation, and reassembly which should be provided by an ATM host adapter when ATM hosts in a small home area ATM network or a small business area ATM network communicate with each other through shared media of single ring topology.

When the ATM host has cells to transmit, the ATM host adapter cyclically transmits the cells to the shared media. The ATM host adapter uses a host memory as a buffer for packets to be segmented. The cells in the host memory are segmented by the ATM host adapter and temporarily stored in a segmentation buffer within the ATM host adapter before being transmitted to a physical link. The cells received from the shared media are classified into drop cells, copy cells, and relay cells so as to be appropriately processed.

The drop cells are temporarily stored in a local memory. Only on valid ATM connection cells are classified and reassembled using the host memory. The relay cells are temporarily stored in a relay buffer within the ATM host adapter and preferentially transmitted to the shared media. When the copy cells are received, the cells are copied within the ATM host adapter and simultaneously transmitted to both the local memory and the relay buffer. The copy cells each is treated with the same process as applied to the drop cells and relay cells.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

With reference to the accompanying drawings, a preferred embodiment of the present invention will now be described.

Figure 1:
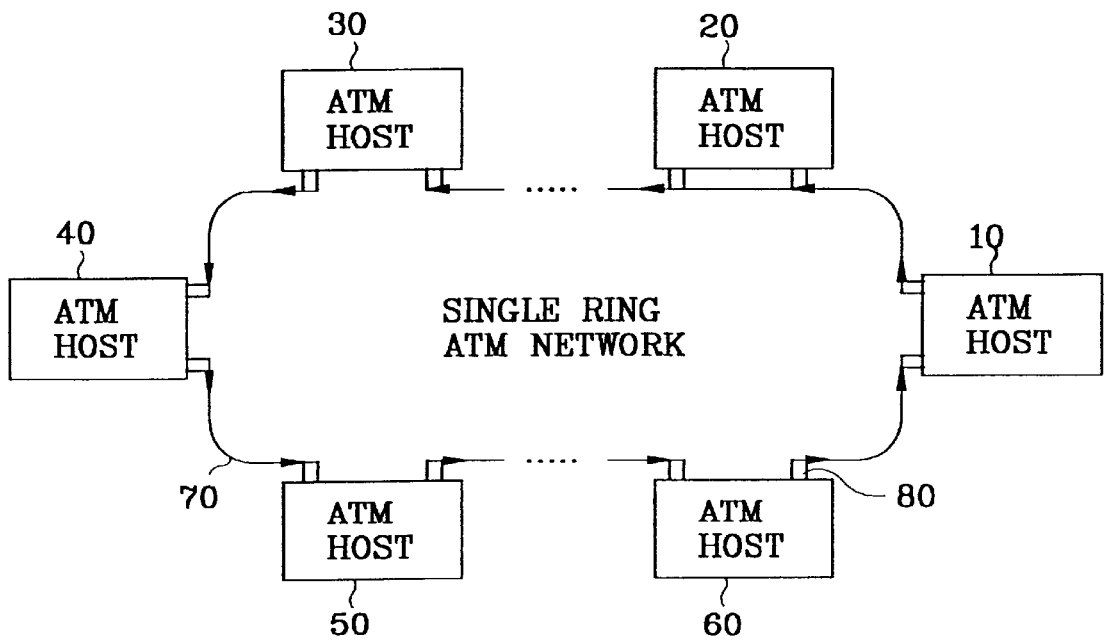
FIG. 1 illustrates how a general ATM host is connected to a single ring ATM network.

As shown in FIG. 1, a plurality of ATM hosts 10 to 60 are connected to shared media forming a single ring 70 so as to communicate with each other. Compared with a general ATM host, the ATM host which is connected to the shared media must have a shared media access function. When flow control for each ATM host connected to the shared media is not properly provided, access fairness problem between the ATM hosts can occurs. There are two kinds of ATM traffic over the shared media: one that a timing is critical and the other that the timing is non-critical. When the ATM host processes cells relayed according to the traffic properties of each ATM connection, the functions of the ATM host become very complicated.

Figure 2:
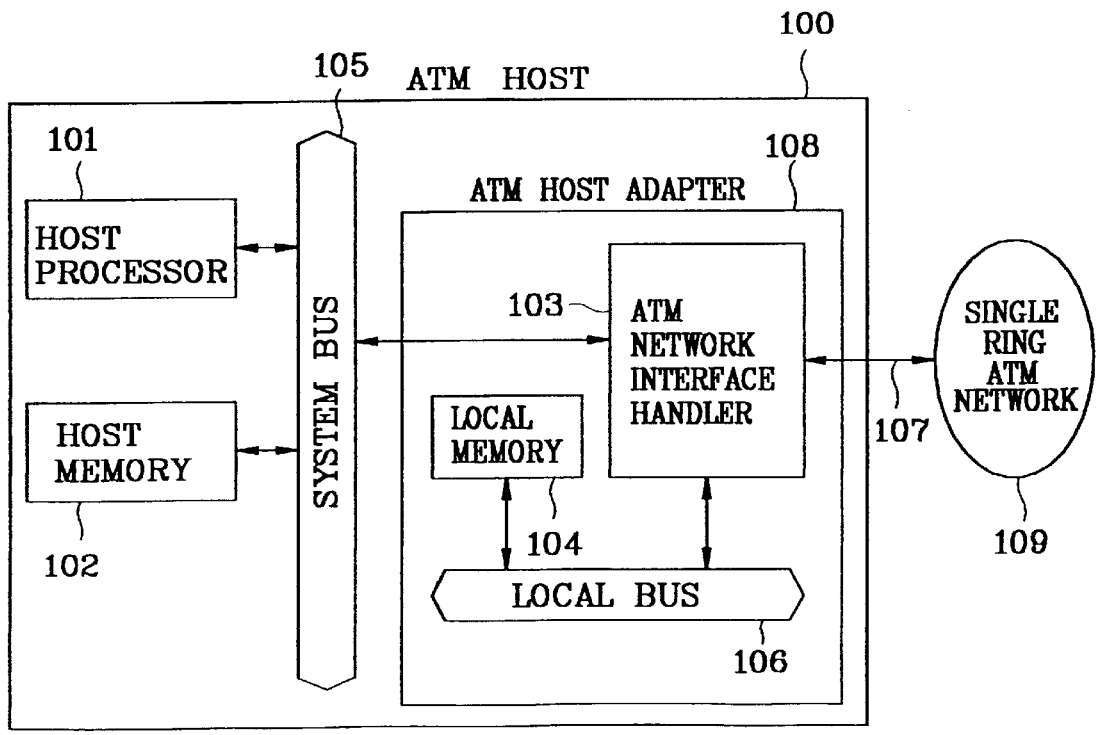
FIG. 2 is a block diagram of an ATM host according to an embodiment of the present invention.

Referring to FIG. 2, an ATM host 100 according to the present invention comprises a host processor 101, a host memory 102, an ATM host adapter 108, and a system bus 105 which connects the host processor 101, the host memory 102, and the ATM host adapter 108 to each other.

The ATM host adapter 108 comprises an ATM network interface handler 103, a storage block 104 for storing information transmitted from the ATM network interface handler 103, and an interface block 106 for connecting the ATM network interface handler 103 to the storage block 104. The storage block 104 corresponds to a local memory, and the interface block 106 corresponds to a local bus. The ATM host adapter 108 is connected to a single ring ATM network 109 via a physical media bus 107.

The ATM host 100 has initialization for an operation of the ATM host adapter 108 and packets to be segmented ready in the host memory 102. The ATM host 100 also transmits reassembled packet information in the host memory 102 to an upper network.

Referring to FIGS. 3 to 13, the ATM host adapter according to the present invention will now be described in detail.

Figure 3:
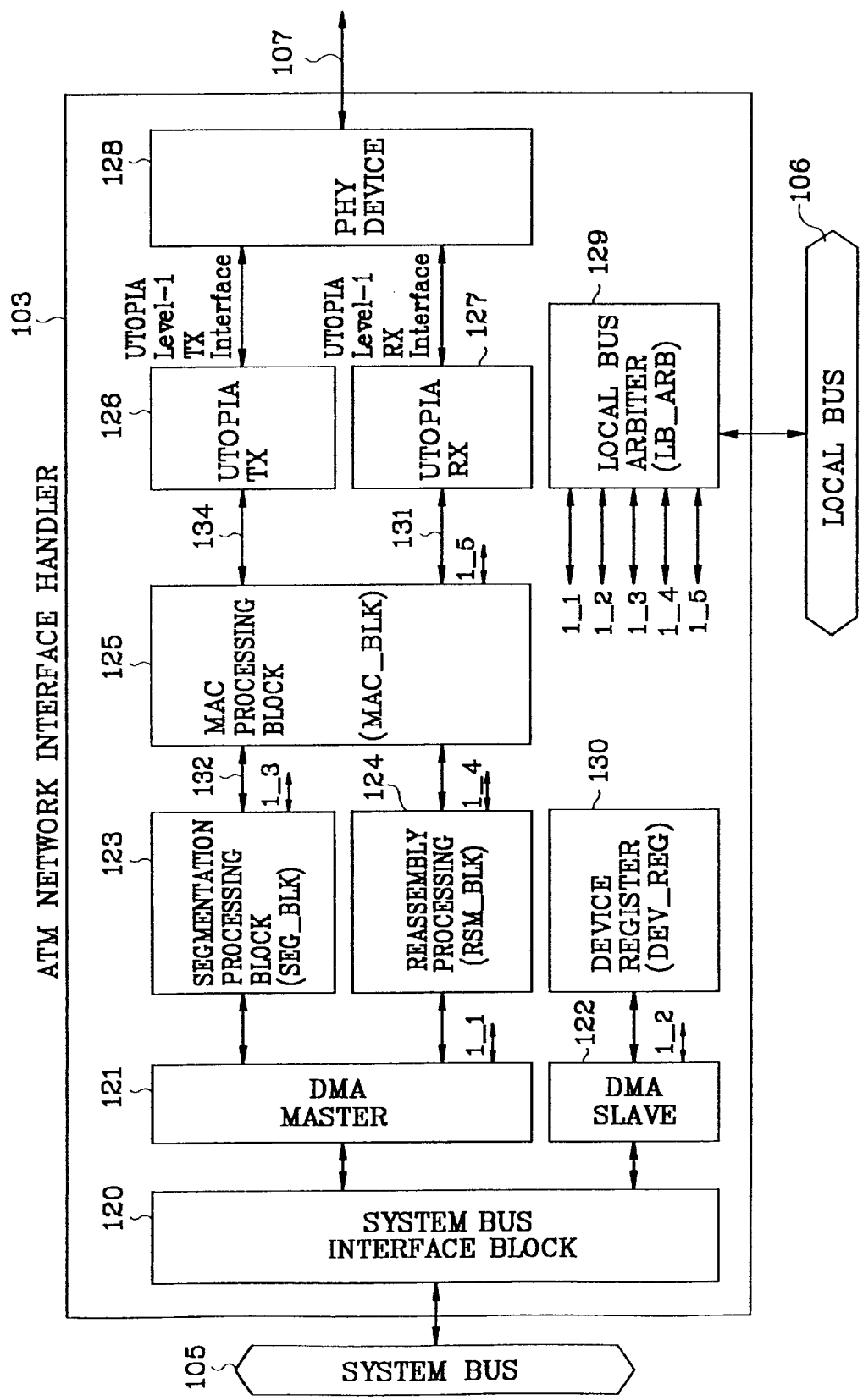
FIG. 3 is a block diagram of the ATM network interface handler depicted in FIG. 2.

As shown in FIG. 3, the ATM network interface handler 103 depicted in FIG. 2 comprises: a system interface block 120 for interfacing the system bus 105; a master block 121 for performing direct memory access of transmit/receive ATM cells through the system bus 105; a slave block 122 for performing direct memory access of parameters in a device register 130 and the local memory of the storage block 104; a segmentation processing block 123 for segmenting packet information stored in the host memory 102; a reassembly processing block 124 for reassembling received cells stored in the local memory of the storage block 104 using the host memory 102; a media access control (MAC) processing block 125 for controlling shared media access at an ATM cell level; a transmit interface block 126 for transmitting cells from the MAC processing block 125 to a physical media matching block 128 through UTOPIA interface; a receive interface block 127 for transmitting cells from the physical media processing block 128 to the MAC processing block 125 through UTOPIA interface 131; the physical media processing block 128 for transmitting and receiving ATM cells to physical media; a local bus arbiter 129 for arbitrating in access by each block in the ATM network interface handler 103 to the local memory of the storage block 104 and connecting with the local bus of the interface block 106 in accordance with properties of the local memory; and a register 130 for storing control and status parameters of the ATM network interface handler 103.

The system interface block 120 provides system bus master and slave functions. The master function of the system interface block 120 is taking the initiative in the system bus 105 and processing information for transmission of the cells via the system bus 105 when the master block 121 burst reads or writes the cells from/into the host memory 102. The system interface block 120 has a pair of built-in asynchronous first in first outs (FIFOs) for compensation of difference between a system bus clock used when burst reading and writing the cells and an operating clock of an ATM adapter card.

The slave function of the system interface block 120 provides a system bus 105 interface function when the host processor 101 requests access to the register 130 or storage block 104 via system bus 105. The system interface block 120 for slave function has also another pair of built-in asynchronous FIFOs for compensation of difference between a system bus clock used when the host processor 101 burst reads and writes data and an operating clock of the ATM adapter card.

The master block 121 interfaces the master function of the system interface block 120, the segmentation processing block 123, and the reassembly processing block 124 to transmit and receive cell data via the system bus 105. When the segmentation processing block 123 requests cell data read from the host memory 102, the master block 121 requests the system interface block 120 to perform direct memory access (DMA) into the host memory 102. If the system interface block 120 successfully reads the cells, the master block 121 transmits the cells to the segmentation processing block 123. When the reassembly processing block requests cell write to the host memory 102, the master block reads cell information from the storage block 104 and requests host memory write DMA of the system interface block 120. The master block 121 also provides functions of generating and checking CRC-32 with respect to AAL5 CPCSPDU, generating and checking CRC-10 with respect to AAL3/4, OAM/RM cells, and padding with respect to AAL5 CPCS-PDU in hardware.

The slave block 122 performs the DMA function allowing the host processor 101 to read/write information in the register 130 or storage block 104 through the system bus 105. When the host processor 101 commands to write burst data, the slave block 122 stores the data transmitted from the system interface block 120 in a temporary buffer and transmits the burst data to the register 130 or the storage block 104. When the host processor 101 commands to read burst data, the slave block 122 transmits related information from the register 130 or the storage block 104 to the system interface block 120.

Figures 4, 5:
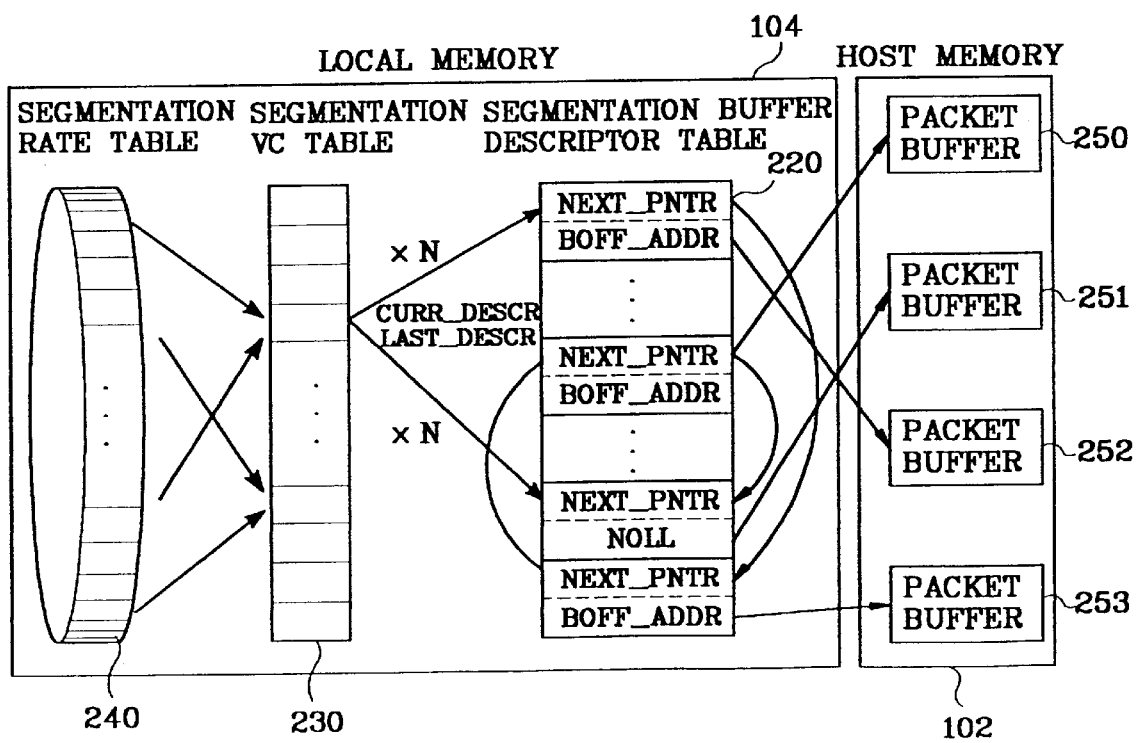
FIG. 4 shows structure of a local memory which is managed by the segmentation processing block depicted in FIG. 3.
FIG. 5 illustrates a process where the segmentation processing block of FIG. 3 segments packet data in a host memory using a local memory.

Referring to FIG. 4, the local memory of the storage block 104 comprises a segmentation status queue 200, a segmentation transmit ring 210, segmentation descriptor table 230, a segmentation virtual channel (VC) table 230, and a segmentation rate table 240.

The segmentation status queue 200 is in the storage block 104. When segmentation of packets in the host memory 102 is finished, the segmentation processing block 123 stores result information of the segmentation in the segmentation status queue 200 and then transmits it to the host processor 101 via an interrupt register of the register 130.

The segmentation transmit ring 210 is used when the host processor 101 sequentially transmits to the segmentation processing block 123, information of locations, sizes, and segmentation VC table 230 entry indexes of each segmentation packet buffer which is scattered in the host memory. The segmentation processing block 123 sequentially reads entry contents of the segmentation transmit ring 210 and forms linked lists for each ATM connection using the segmentation descriptor table 220 according to each entry index of the segmentation VC table 230.

The segmentation descriptor table 220 is largely divided into a portion of forming and storing the linked lists for each entry of the segmentation VC table 230 based upon information sequentially transmitted via the segmentation transmit ring 210 and a portion of a linked list linking free segmentation descriptor table 220 entries. The segmentation processing block 123 links contents of packet buffer description transmitted from the segmentation transmit ring 210 according to each ATM connection using the free segmentation descriptor table 220 entries and links each entry of the segmentation descriptor table 220 where the segmentation is completed to each free segmentation descriptor table 220 entry.

Each entry of the segmentation VC table 230 stores segmentation information about an ATM connection which has been set up, that is, an ATM cell header, an AAL type, location information of a head and tail of the linked list in the segmentation descriptor table 220, and a temporary CRC-32 value in case of an AAL5 connection. The host processor 101 provides initialization of the segmentation VC table 230. The segmentation processing block 123 adds the cell header to a segmented cell payload using the initialized segmentation VC table 230 so as to construct a cell. For the AAL5 connection where the segmentation is completed, each CRC-32 value is inserted before transmission and the CRC-32 values are all initialized to "1".

The segmentation processing block 123 also provides a traffic shaping function with respect to CBR, VBR, and UBR traffic using the segmentation rate table 240. The segmentation processing block 123 settles order of the ATM connections to be segmented while sequentially searching entries of the segmentation rate table 240. The segmentation rate table 240 is used only for CBR and VBR services. Each cell of different ATM connections are multiplexed using the segmentation rate table 240. By properly allocating multiple entries of the segmentation rate table 240 to a single ATM connection, the cells can be transmitted within a maximum bandwidth allocated by connections. When the segmentation processing block 123 has no data to transmit over CBR and VBR connections, it transmits UBR connection ATM cells using a special UBR linked list. The UBR linked list is constructed ATM cells using the entries of the segmentation VC table 230. Segmentation VC table 230 entries conforming to the UBR connection are linked each other, thus constructing the UBR linked list.

As shown in FIG. 5, the segmentation processing block 123 segments packet buffers 250 to 253 in the host memory using the segmentation rate table 240, the segmentation VC table 230, and the segmentation descriptor table 220 in the local memory of the storage block 104.

The segmentation processing block 123 reads relevant entry information of the segmentation VC table 230 using the entry index of the segmentation rate table 240. The segmentation processing block 123 reads each entry of the segmentation descriptor table 220 using a $CURR_{13}$ DESCR pointer of the entry information of the segmentation VC table 230. Each entry of the segmentation descriptor table 220 contains information of a segmentation packet buffer location within the host memory 102, so the segmentation processing block 123 can segment packets using these entries. $CURR_{13}$ DESCR and $LAST_{13}$ DESCR in FIG. 5 respectively indicate a head pointer and a tail pointer of the linked list constructed within the segmentation descriptor table 220 for each ATM connections.

Figures 6, 7:
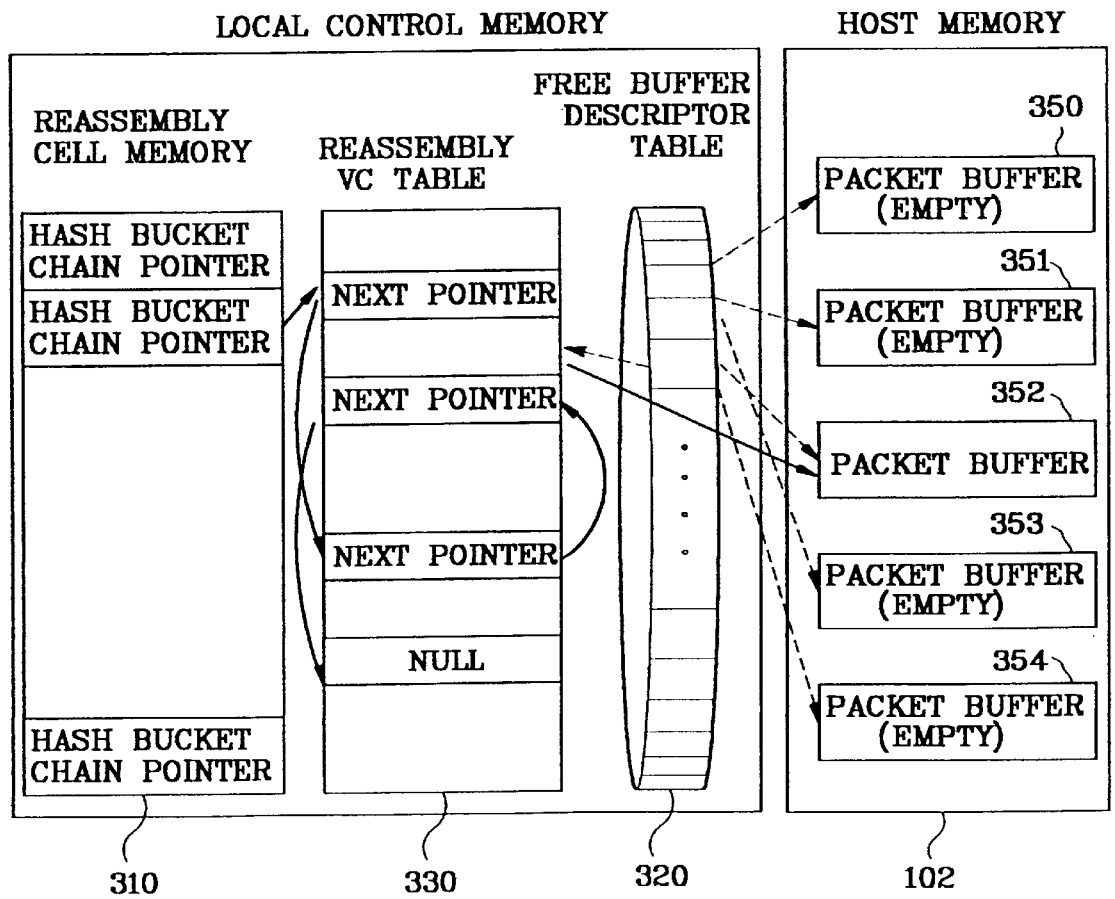
FIG. 6 shows structure of a local memory managed by the reassembly processing block depicted in FIG. 3.
FIG. 7 illustrates a process that the reassembly processing block of FIG. 3 reassembles cells into a packet in a host memory using a local control memory.

As shown in FIG. 6, the local memory managed by the reassembly processing block comprises a reassembly status queue 300, a reassembly cell buffer 310, a reassembly free buffer descriptor table 320, a reassembly VC table 330, and a reassembly hash table 340.

The reassembly status queue 300 is in the local memory of the storage block 104. After finishing reassembling received cells into packets using the host memory 102, the reassembly processing block 124 stores result information in the reassembly status queue 300 and transmits it to the host processor 101 via the interrupt register of the register 130.

Figure 10:
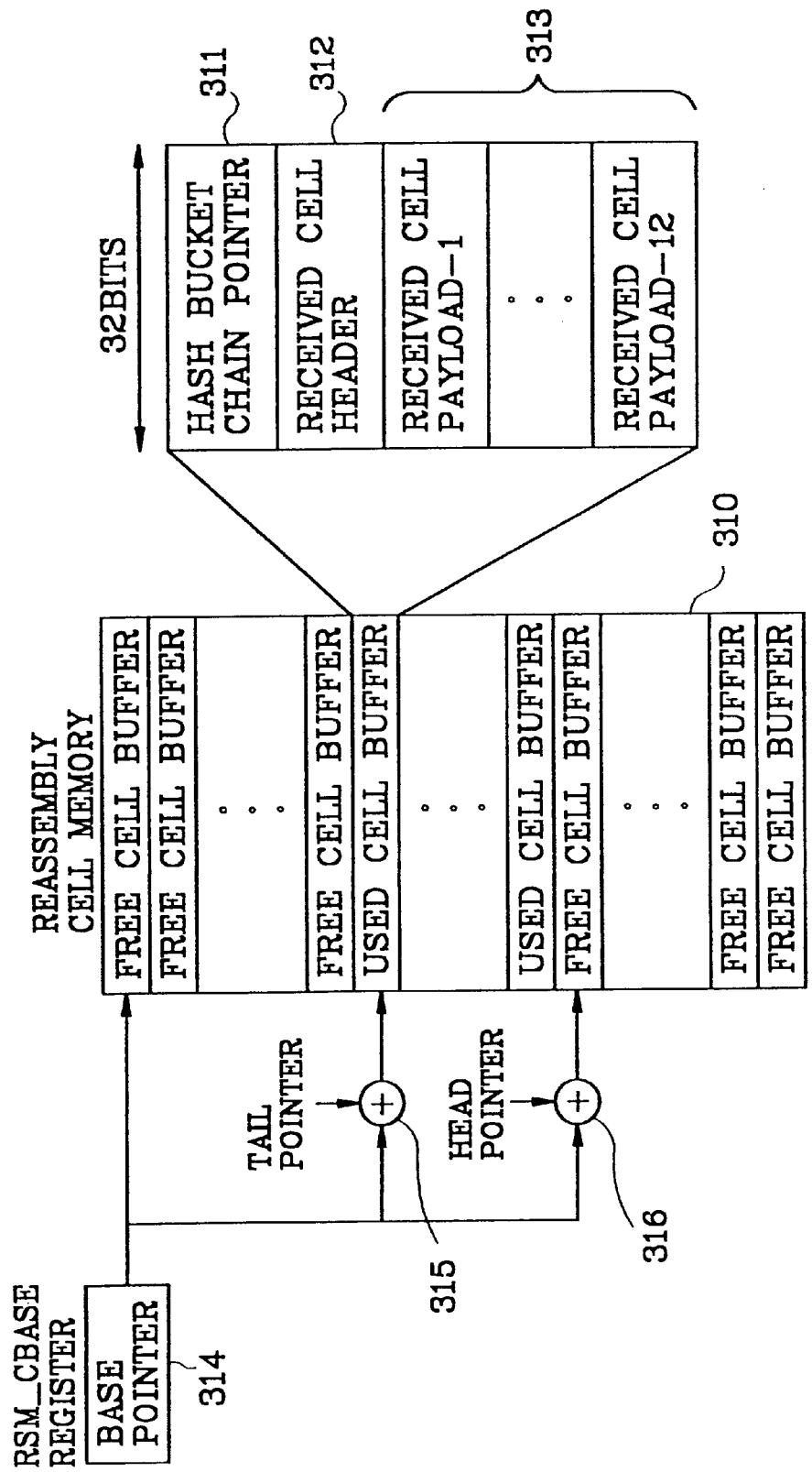
FIG. 10 shows a configuration of the reassembly cell memory depicted in FIG. 6 in detail.

The reassembly cell memory 310, as shown in FIG. 10, temporarily stores cells transmitted from the MAC processing block 125. The reassembly cell memory 310 comprises free cell buffers and used cell buffers. Used cell buffer fields can be grasped using head pointer 316 and tail pointer 315 information and a RSM-CBASE register 314 in the device register 130. The $RSM_{13}$ CBASE register 314 is a starting address of the reassembly cell memory within the local memory. The head pointer 316 and the tail pointer 315 respectively correspond to start and last location information of the used cell buffer. Each used cell buffer comprises a hash bucket chain pointer 311 obtained by a hashing block 440, in FIG. 11, from a cell received by the MAC processing block 125, a received cell header 312 except head error control (HEC) field of the received cell, and received cell payloads 313.

The reassembly free buffer descriptor table 320, as shown in FIG. 7, contains address and size information of each empty packet buffer 350, 351, 353, and 354 in the host memory 102 where received cells can be reassembled. When receiving a first cell belonging to a particular connection, the reassembly processing block 124 fetches relevant information from the reassembly free buffer descriptor table 320 and reassembles the received cells in the host memory 102. The reassembly free buffer descriptor table 320 is initialized and managed by the host processor 101. When a packet buffer for reassembly is all used, the reassembly processing block 124 sequentially fetches entries of the reassembly free buffer descriptor table 320 and resumes reassembly of the received cells. Location information of packet buffers where the reassembly has been completed is transmitted to the host processor 101 via the reassembly status queue 300. The host processor 101 processes the information and sequentially transmits the information to the reassembly free buffer descriptor table 320, thus allowing the relevant buffers to be reused.

Each entry of the reassembly VC table 330 stores reassembly information about the ATM connection which has been set up, that is, an ATM cell header, an AAL type, address and size information of a packet buffer which is used for the reassembly of received cells, and a temporary CRC-32 value in case of AAL5 connection. Contents of each entry of the reassembly VC table 330 are initialized by the host processor 101. Particular entries of the reassembly VC table 330, as shown in FIG. 7, construct a single hash bucket chain, which is used for validation of the received cell header. For the AAL5 connection where the packet reassembly from the received cells is completed, the CRC-32 values are all reinitialized to "1".

Figures 8, 9:
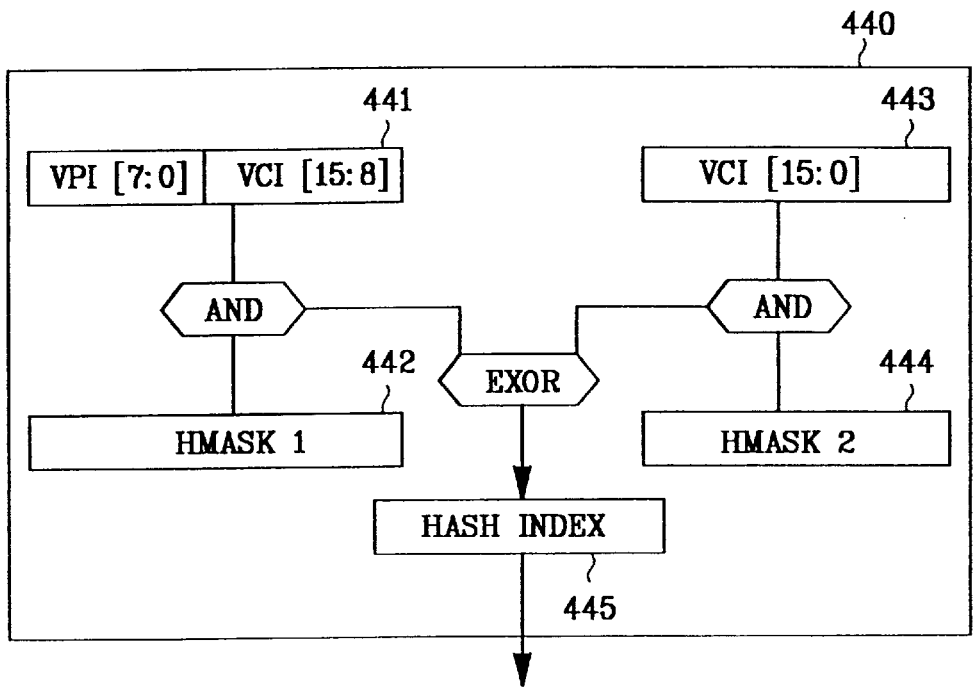
FIG. 8 is a block diagram of the hashing function.
FIG. 9 shows detailed regions of the reassembly hash table of FIG. 6.

The reassembly hash table 340 has structure as shown in FIG. 9. One of the hash table indexes 346 has the same value as a hash index 445 which is measured by a hashing function depicted in FIG. 8. Each mode 2-bit 347 in the reassembly hash table 340 is used for classifying the received cells for each hash buckets(hash index values)as a drop cell, a relay cell, or a copy cell. Each hash bucket chain pointer 348 in the reassembly hash table 340, as shown in FIG. 7, indicates a start location of a relevant hash bucket chain within the reassembly VC table 330.

As shown in FIG. 7, the reassembly processing block 124 reassembles received cells in the packet buffers 350 to 354 within the host memory 102 using the reassembly cell memory 310, the reassembly VC table 330, and the free buffer descriptor table 320 in the local memory.

While sequentially searching the used cell buffers in the reassembly cell memory 310, the reassembly processing block 124 reads a hash bucket chain pointer 311 and a received cell header 312 from each used cell buffer. The reassembly processing block 124 fetches a cell header value and an entry point of the next reassembly VC table 330 from an entry of the reassembly VC table 330 corresponding to a relevant hash bucket chain pointer 311 and checks whether a relevant received cell header 312 value matches the cell header value of the relevant entry of the reassembly VC table 330. If two values do not match, the identical procedure as described above is repeated using a pointer next to the one which has been fetched. The entries of the reassembly VC table 330 each connected to its next entry pointer, as described above, construct a single hash bucket chain. Checking of header match has successfully been accomplished using the hash bucket chain, the reassembly processing block 124 fetches address information of a packet buffer where the reassembly will be performed from the relevant entry of the reassembly VC table 330 and requests the master block to perform the DMA of the received cell. When there is no packet buffer 352 for the reassembly, a new reassembly packet buffer is allocated to the reassembly processing block 124 from the free buffer descriptor table 320. Then the reassembly processing block 124 requests the master block 121 to perform the DMA of the received cell.

FIGS. 8 and 9 have already been described in detail while describing about FIG. 6.

Figure 11:
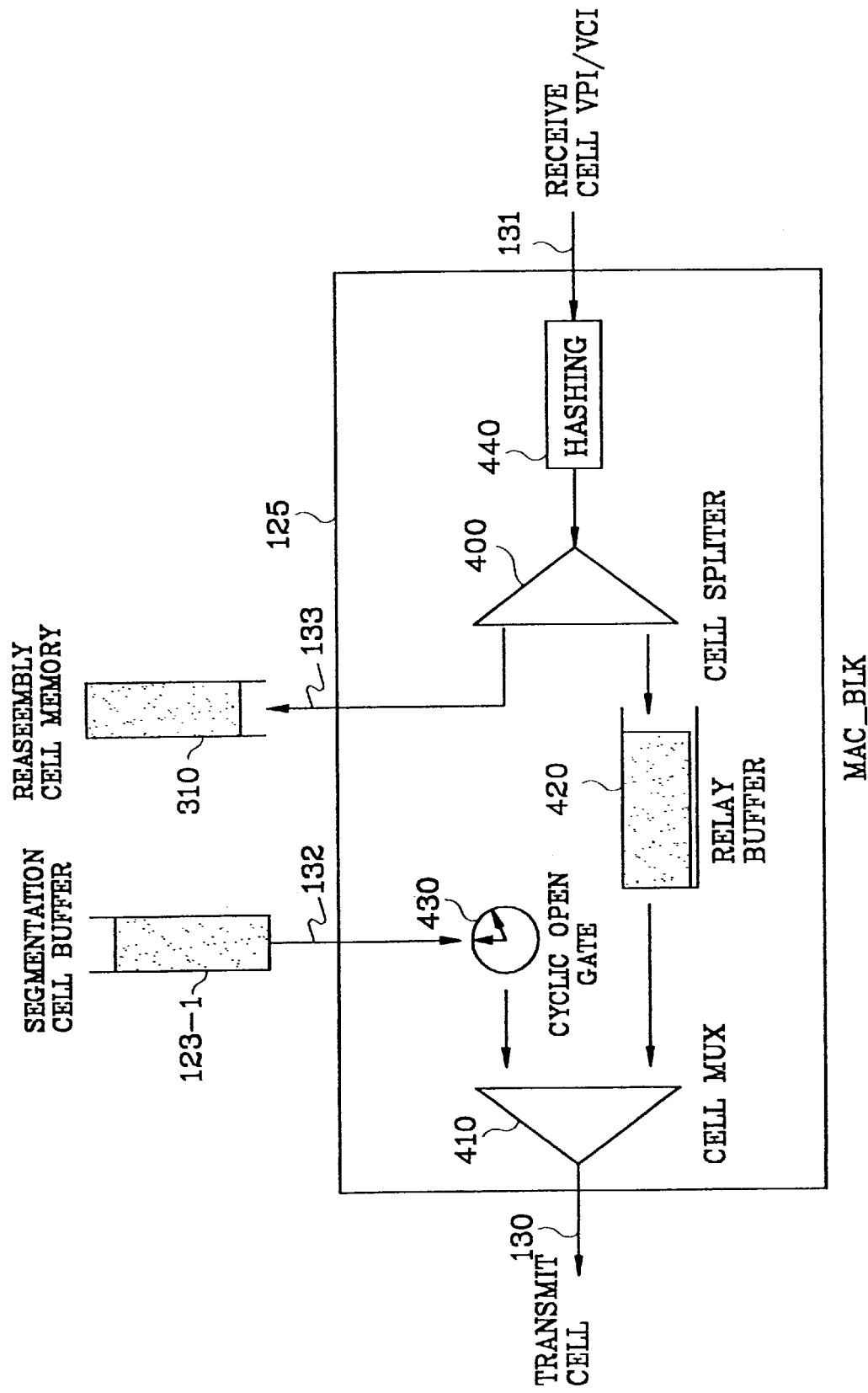
FIG. 11 is a block diagram of an embodiment of the media access control (MAC) processing block depicted in FIG. 3.

Referring to FIG. 11, the MAC processing block 125 comprises a cell splitter 400, a cell multiplexer 410, a relay cell buffer 420, a cyclic open gate 430, and a hash index calculation block 440.

The MAC processing block 125 fetches 2-bit mode 347 information and a 24-bit hash bucket chain pointer 348 from the reassembly hash table 340 using the hash index 445 obtained by the hashing block 440.

The cell splitter 400 identifies the cell transmitted from the receive interface block 127 via a bus 131 according to the 2-bit mode 347 and transmits the cell to the reassembly cell memory 310 via the bus 133 when the cell is the drop cell, stores the cell in the relay cell buffer 420 when the cell is the relay cell, and copies and stores the cell in the reassembly cell memory 310 and the relay cell buffer 420 when the cell is the copy cell.

The cell multiplexer 410 multiplexes cells in a segmentation cell buffer 123-1 of the segmentation processing block 123 and cells in the relay cell buffer 420. The cells in the relay cell buffer 420 are preferentially transmitted. When there is no cell to be transmitted in the relay cell buffer 420, the cyclic open gate 430 is opened, and there are some cells in the cell segmentation cell buffer 123-1, the cell multiplexer 410 reads the cells from the segmentation buffer 123-1 via a bus 132. The multiplexed cells are transmitted to the transmit interface block 126 via a bus 134 (FIG. 3).

In the hashing block 440 as shown in FIG. 8, a received cell header is divided into a field of a VPI[7:0]VCI[15:8] 441 and a field of VCI[15:0] 443. The received cell header is masked by first and second 16-bit hash registers 442 and 444 in the register 130 and processed by first and second AND gates 446 and 447 and an exclusive OR gate 448, so the hash index 445 is obtained. Through such procedure, maximum 16 bits hash index 445 can be obtained from a 24-bit cell header. The number of hash buckets is determined based upon the maximum value of the hash index 445.

Figure 12:
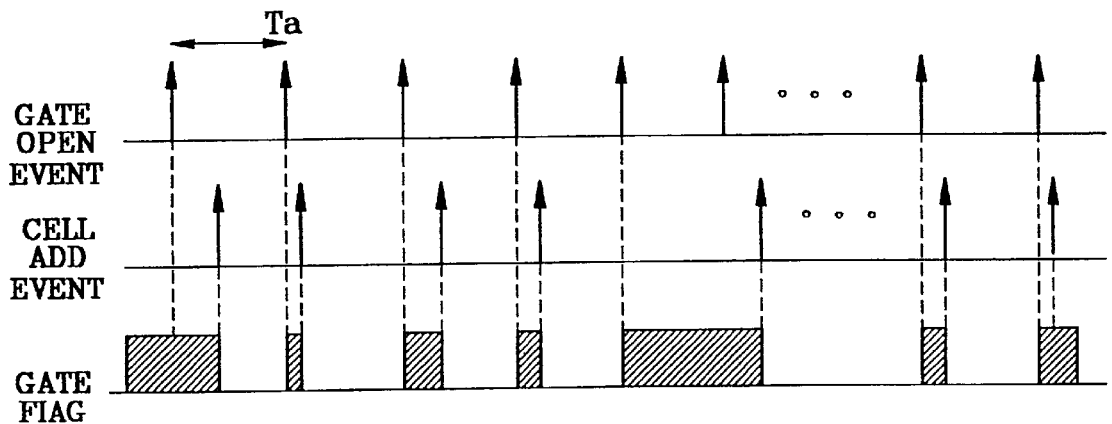
FIG. 12 is a timing chart of the cyclic open gate depicted in FIG. 11.

As shown in FIG. 12, the cyclic open gate 430 opens its gate whenever a gate open event is generated every period of Ta and closes its gate whenever a cell add event of reading cells from the segmentation cell buffer 123-1 is generated. The period, Ta, is proportional to a value of whole traffic generated by the ATM host throughout. "1 cell (53 bit)/Ta" corresponds to a traffic bandwidth of a virtual link generated by a single ATM host. Here, virtual link bandwidth=53 bit/Ta.

Since only a sole cell is added through shared media every period, Ta, thus preventing damage in traffic properties over the shared media and securing access timing slots for every ATM host when the virtual link is constructed by the ATM hosts over the shared media. Through such method, a fairness problem can be easily resolved without implementation of a complicated media access control function when a small ATM host accesses high speed shared media.

Figure 13:
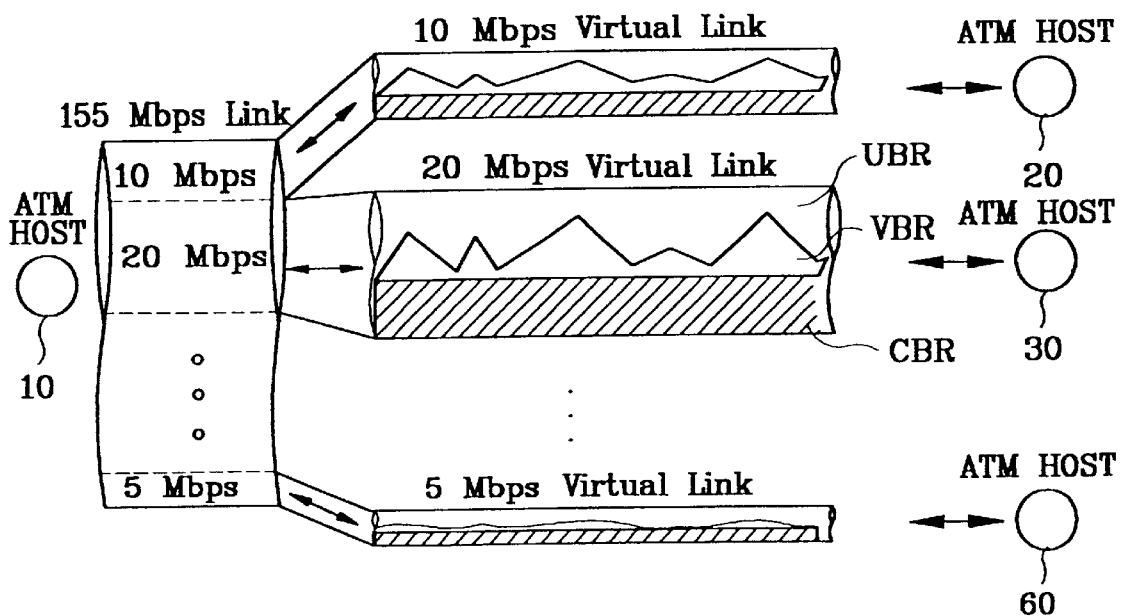
FIG. 13 illustrates structure of virtual links between ATM hosts using a 155 Mbps shared link.

As shown in FIG. 13, the ATM host can multiplex CBR, VBR, and UBR traffic cells into the shared media through a single virtual link. It is assumed that traffic between ATM hosts are symmetrical in this invention.

According to the ATM host adapting apparatus of the present invention illustrated above, since only a sole cell is added through shared media every period, Ta, thus preventing damage in traffic properties over the shared media and securing access timing slots for every ATM host when the virtual link is constructed by the ATM hosts over the shared media.

Additionally, ATM hosts of the present invention preferentially transmits the relay cell to the shared media without considering the properties of traffic, thereby accomplishing maximum maintenance of traffic shaping effect which is initially performed by each ATM host in communication between the ATM hosts over the shared media.

According to the method where received cells are divided by hash bucket groups and the medium access control (MAC) of the cells is performed according to the present invention, the received cells can be divided using more simple logic within a shorter period of time compared with a method of processing the ATM MAC function by ATM connections.

The present invention performs segmentation using the host memory when an amount of traffic generated by each ATM host is not much, thus reducing the capacity of the local memory of the ATM host adapter. Consequently, overhead expenses can be cut down.

Since the present invention stores the cells transmitted from the physical media using the local memory bus, it can be adapted to even the case where there is large variation in a latency time in the system bus.

It will be apparent to those skilled in the art that various modifications and variations can be made in an ATM host adapting apparatus with ability of shared media access of the present invention without deviating from the spirit or scope of the invention. Thus, it is intended that the present invention cover the modifications and variations of this invention provided they come within the scope of the appended claims and their equivalents.

What is claimed is:

1. An asynchronous transfer mode (ATM) host adapting apparatus comprising:
    storage means for storing segmentation and reassembly parameters and received ATM cells;
    ATM network interface handling means for performing direct memory access of said received ATM cells and said segmentation and reassembly parameters stored therein, segmenting transmit packet information stored in a host memory, reassembling received ATM cells using said host memory, transmitting and receiving said ATM cells to physical shared media and arbitrating in said direct memory access; and
    local bus means for connecting said storage means to said ATM network interface handling means,
    wherein said ATM network interface handling means comprises:
        system interface means for interfacing a system bus;
        master means for performing direct memory access of transmit and receive ATM cells through said system interface means;
        slave means for performing direct memory access of said segmentation and reassembly parameters of said storage means;
        major processing means for segmenting transmit packet information through said master means and reassembling said received ATM cell;
        matching means for transmitting and receiving ATM cells while conforming the ATM cells to physical media transmit frames;
        media access control processing means for controlling shared media access at an ATM level;
        interface means for transmitting transmit ATM cells from said media access control processing means to said matching means and transmitting received ATM cells from said matching means to said major processing means; and
        arbitrating means for arbitrating in access of said storage means.

2. An ATM host adapting apparatus as claimed in claim 1, wherein said major processing means comprises:
    segmentation processing means for segmenting packet information transmitted via said master means; and
    reassembly processing means for reassembling received ATM cells stored in said storage means.

3. An ATM host adapting apparatus as claimed in claim 1, wherein said interface means comprises:
    transmit interface means for transmitting transmit ATM cells from said segmentation processing means to said matching means; and
    received interface means for transmitting received ATM cells from said matching means to said reassembly processing means.

4. An ATM host adapting apparatus as claimed in claim 1, wherein said media access control processing means comprises:
    hashing means for masking received ATM cells and outputting hash data indexes;
    cell splitting means for splitting output signals of said hashing means into relay cells and drop cells;
    relay cell buffering means for temporarily storing and buffering the relay cells transmitted from said cell splitting means;
    transmitting means for transmitting received ATM cells by opening its gate every predetermined period; and
    multiplexing means for multiplexing received ATM cells from said cell buffering means and said transmitting means.

5. An ATM host adapting apparatus as claimed in claim 1, wherein said system bus interface means comprises asynchronous first-in/first-out (FIFO) devices arranged to compensate the difference between a system bus clock used when burst reading and writing the data cells and an operating clock of said ATM host adapting apparatus.

6. A host adapter installed for use in a host system comprising a host processor and a host memory, said host adapter comprising:
    a local memory arranged to store segmentation and reassembly parameters and data cells received via physical shared media; and
    a DMA master/slave arranged to perform direct memory access of data cells and segmentation and reassembly parameters stored in said local memory;
    a segmentation processor arranged to perform segmentation of data from said host memory into units of data cells using said segmentation parameters for temporary storage in said local memory before transmission, via said physical shared media;
    a reassembly processor arranged to reassemble data cells received, via said physical shared media, in said host memory using said reassembly parameters; and
    an arbiter arranged to arbitrate said direct memory access.

7. A host adapter as claimed in claim 6, further comprising:
    a system bus interface arranged to interface a system bus connecting said host processor and said host memory;
    a transmit interface arranged to transmit data cells from said segmentation processor via said physical shared media;
    a receive interface arranged to transmit data cells received from said physical shared media to said reassembly processor; and
    a media access control (MAC) processor arranged to control shared media access.

8. A host adapter as claimed in claim 6, wherein said DMA master/slave comprises:
    a DMA master arranged to perform direct memory access transmit/receive data cells via said system bus; and
    a DMA slave arranged to perform direct memory access said segmentation and reassembly parameters needed for segmentation and reassembly.

9. A host adapter as claimed in claim 7, wherein said MAC processor comprises:
    a hash index calculator arranged to mask receive data cells and produce hash data indexes;
    a cell splitter arranged to identify data cells received from said receive interface and split data cells according to hash data indexes into relay cells and drop cells;

a relay buffer arranged to temporarily store the relay cells;

a cyclic gate arranged to enable passage of data cells from said segmentation processor by opening its gate at predetermined period; and a cell multiplexer arranged to select data cells from said relay buffer and said cyclic gate for transmission, via said transmit interface.

10. A host system as claimed in claim 7, wherein said system bus interface comprises asynchronous first-in/first-out (FIFO) devices arranged to compensate the difference between a system bus clock used when burst reading and writing the data cells and an operating clock of said host adapter.

11. A host system comprising:

a host processor;

a host memory arranged to store data to be segmented as units of data cells and data to be assembled as units of data packets; and a host adapter card coupled to the host processor and the host memory, via a system bus, and installed to provide access to physical shared media, said host adapter card comprising:

a local memory arranged to store segmentation and reassembly parameters and data cells received via said physical shared media;

a network interface handler arranged to perform direct memory access of data cells and segmentation and reassembly parameters, to perform segmentation of data from said host memory into units of data cells using said segmentation parameters stored in said local memory for temporary storage in said local memory before transmission, via said physical shared media, to reassemble data cells received, via said physical shared media, in said host memory using said reassembly parameters stored in said local memory, and to arbitrate said direct memory access; and a local bus arranged to connect said local memory to said network interface handler.

12. A host system as claimed in claim 11, wherein said network interface handler comprises:

a system bus interface arranged to provide an interface to said system bus;

master/slave means arranged to perform direct memory access of transmit/receive data cells through said system bus interface, and said segmentation and reassembly parameters;

major processing means arranged to perform segmentation of data from said host memory into units of data cells using said segmentation parameters and to reassemble data cells received in said host memory using said reassembly parameters;

matching means arranged to transmit and receive data cells via said physical shared media;

a media access control (MAC) processor arranged to control shared media access;

interface means arranged to provide an interface between said MAC processor and said matching means; and an arbiter arranged to arbitrate access of said local memory, via said local bus.

13. A host system as claimed in claim 12, wherein said major processing means comprises:

a segmentation processor arranged to segment data from said host memory using said segmentation parameters; and a reassembly processor arranged to reassemble data cells received in said host memory using said reassembly parameters.

14. A host system as claimed in claim 13, wherein said master/slave means comprises:

a DMA master arranged to perform direct memory access transmit/receive data cells via said system bus; and a DMA slave arranged to perform direct memory access said segmentation and reassembly parameters needed for segmentation and reassembly.

15. A host system as claimed in claim 13, wherein said interface means comprises:

a transmit interface arranged to transmit data cells from said segmentation processor to said matching means; and a receive interface arranged to transmit data cells received from said matching means to said reassembly processor.

16. A host system as claimed in claim 13, wherein said MAC processor comprises:

a hash index calculator arranged to mask receive data cells and produce hash data indexes;

a cell splitter arranged to identify data cells received from said receive interface and split data cells according to hash data indexes into relay cells and drop cells;

a relay buffer arranged to temporarily store the relay cells;

a cyclic gate arranged to enable passage of data cells from said segmentation processor by opening its gate at predetermined period; and a cell multiplexer arranged to select data cells from said relay buffer and said cyclic gate for transmission, via said transmit interface.

17. A host system as claimed in claim 12, wherein said system bus interface comprises asynchronous first-in/first-out (FIFO) devices arranged to compensate the difference between a system bus clock used when burst reading and writing the data cells and an operating clock of said host adapter card.

* * * * *